United States Patent [19]

Nakajima

[11] Patent Number: 5,410,369
[45] Date of Patent: Apr. 25, 1995

[54] BROADCASTING RECEIVING APPARATUS WITH POWER CONSUMPTION SAVING FUNCTION

[75] Inventor: Syuji Nakajima, Kunitachi, Japan

[73] Assignee: Casio Computer Co., Ltd., Tokyo, Japan

[21] Appl. No.: 945,125

[22] Filed: Sep. 15, 1992

[30] Foreign Application Priority Data

Sep. 25, 1991 [JP] Japan .................................. 3-274707
Sep. 25, 1991 [JP] Japan .................................. 3-274709

[51] Int. Cl.$^6$ .............................................. H04N 5/44
[52] U.S. Cl. .................... 348/730; 358/335; 455/181.1
[58] Field of Search ................... 358/190, 191.1, 194.1, 358/335, 310, 188; 455/181.1, 184.1; 360/33.1, 35.1; H04N 5/44; 348/730, 731, 734, 725

[56] References Cited

U.S. PATENT DOCUMENTS

| | | | |
|---|---|---|---|
| 4,310,924 | 1/1982 | Miyasaka et al. | 455/181.1 |
| 4,626,106 | 12/1986 | Hooper | 360/33.1 |
| 4,626,909 | 12/1986 | Oniki et al. | 455/181.1 |
| 4,740,828 | 4/1988 | Kinoshita | 358/909 |

FOREIGN PATENT DOCUMENTS

60-46130 3/1985 Japan .................................. 455/181.1

*Primary Examiner*—Mark R. Powell
*Assistant Examiner*—Jeffrey S. Murrell
*Attorney, Agent, or Firm*—Frishauf, Holtz, Goodman & Woodward

[57] ABSTRACT

If it is determined that a current time when a power switch is operated manually is equal to or close to a reservation time indicated by preset reservation time data, a power source automatically starts supplying a power source current to individual circuits of a broadcasting receiving apparatus main body. Otherwise, supply of a power source current to the individual circuits is not performed. This prevents a receiving unit from unnecessarily receiving a broadcasting electric wave. When completion of broadcasting of all broadcasting contents of a broadcasting program is detected, the power source stops supplying the power source current to the individual circuits of the broadcasting receiving apparatus main body. This also prevents the receiving unit from unnecessarily receiving a broadcasting electric wave.

4 Claims, 9 Drawing Sheets

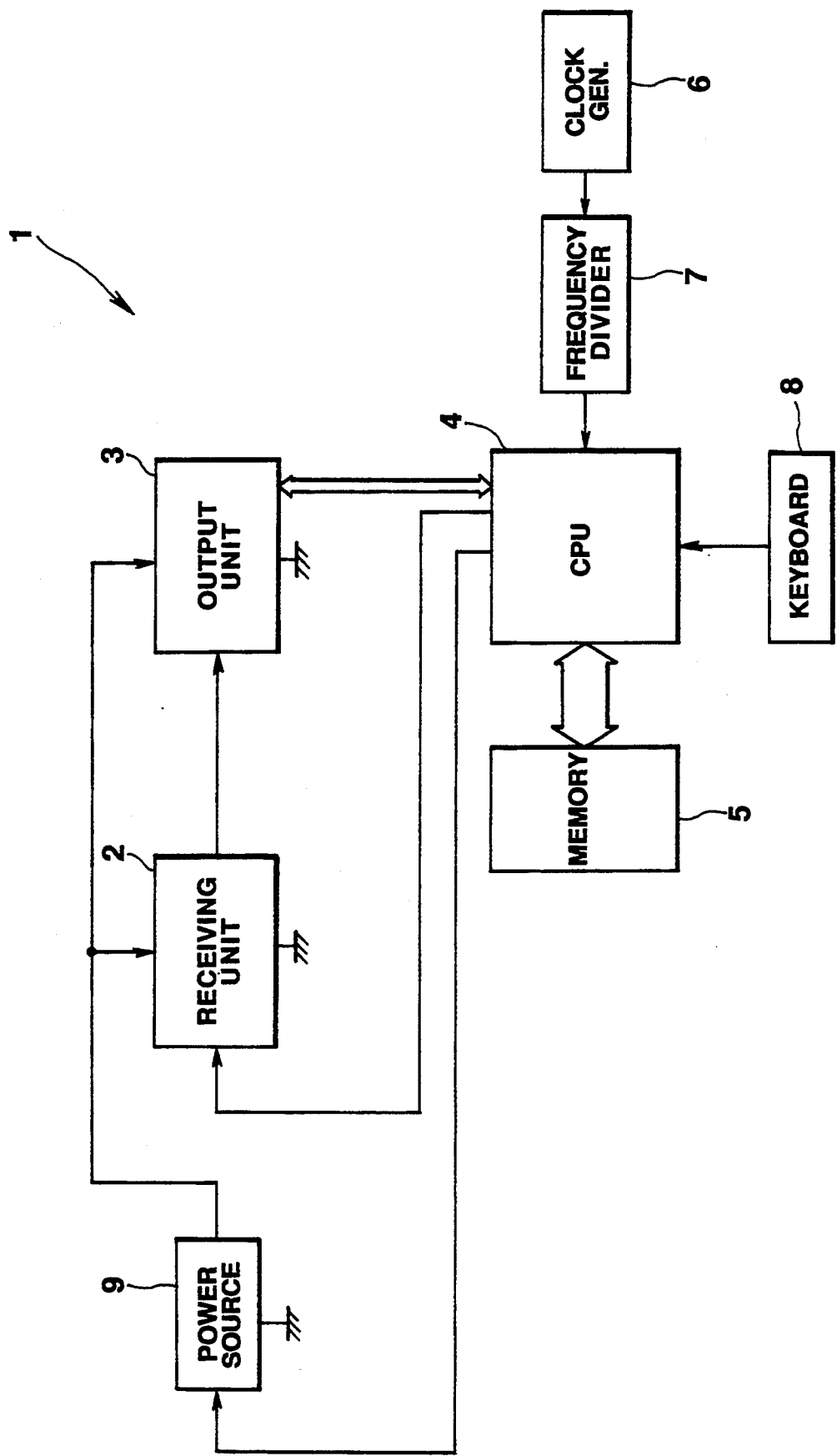

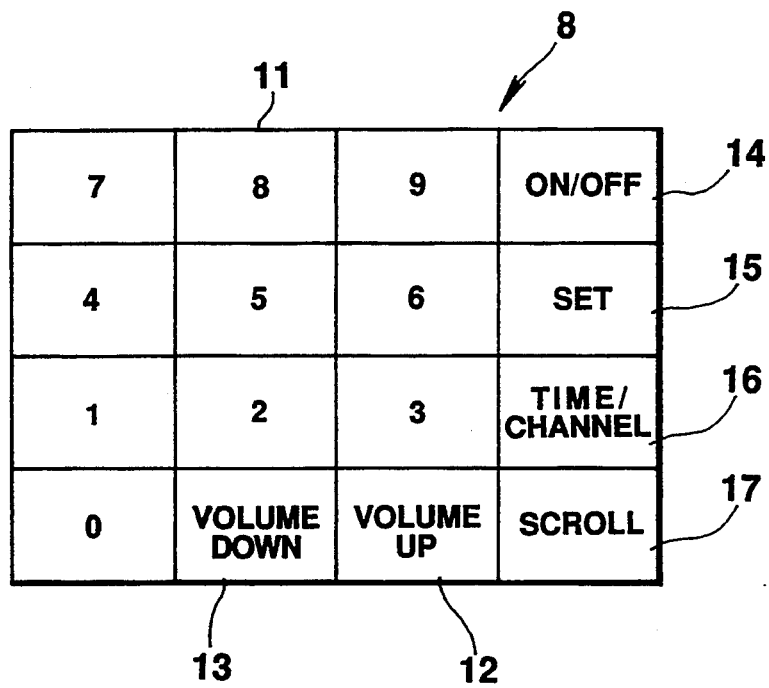

FIG. 9

| | |
|---|---|
| DB8 | INFORMATION SEPARATING CODE |
| DB9 | DATA HEADER PARAMETER |
| DB10 | DATA HEADER DATA LENGTH |
| DB11 | MAGAZINE NUMBER / PROGRAM NUMBER 1 |
| DB12 | PROGRAM NUMBER 2 / PROGRAM NUMBER 3 |
| DB13 | TOTAL NUMBER OF PAGES |
| DB14 | FUNCTION LEVEL / PROGRAM FORM |
| DB15 | PROGRAM PRESENTATION DEVICE |
| DB16 | PAGE PROGRESS |
| DB17 | PROGRAM CONTENT CHANGE FLAG |
| DB18 | PROGRAM DATA LENGTH |
| DB19 | PROGRAM DATA LENGTH |

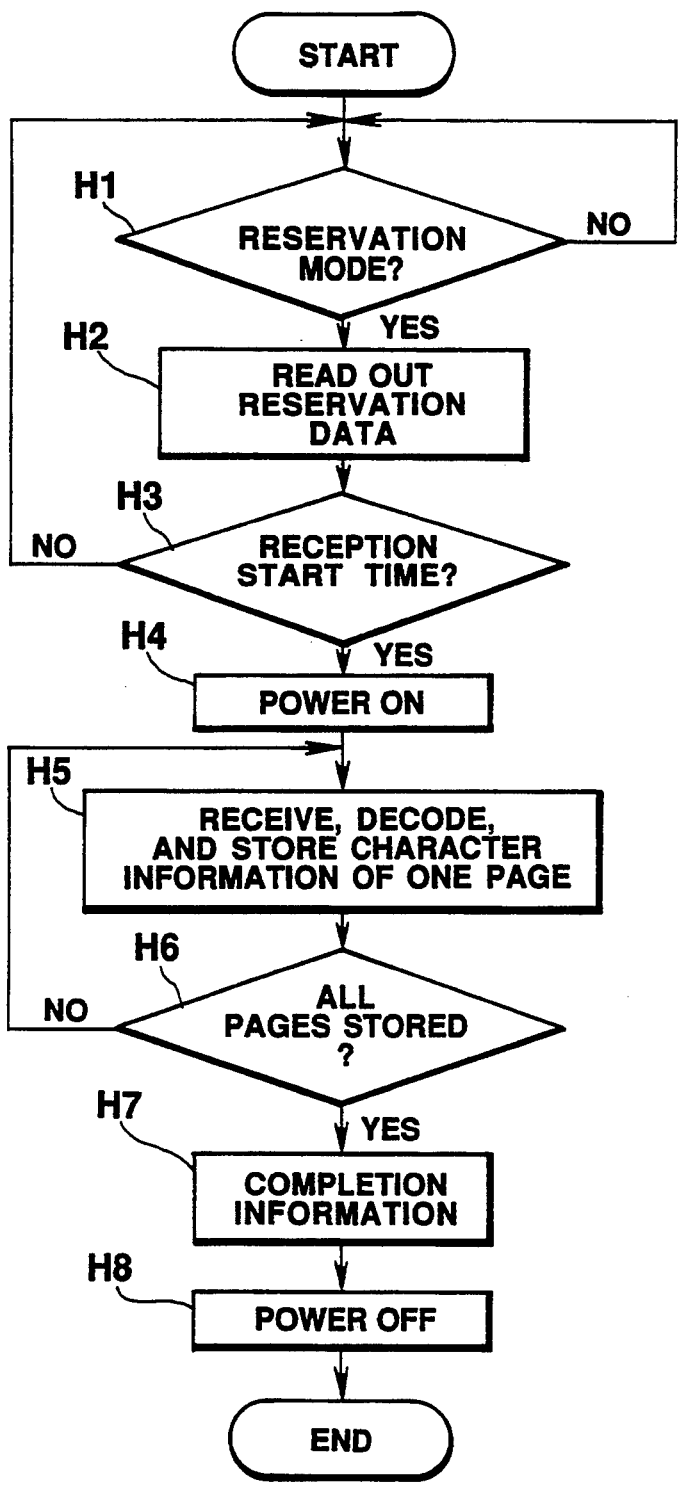

BROADCASTING RECEIVING APPARATUS WITH POWER CONSUMPTION SAVING FUNCTION

BACKGROUND OF THE INVENTION

1. Field of the Invention

The present invention relates to a broadcasting receiving apparatus such as a teletext broadcasting receiving apparatus, a television broadcasting receiving apparatus, or a radio broadcasting receiving apparatus and, more particularly, to a broadcasting receiving apparatus capable of saving power consumption of the overall apparatus.

2. Description of the Related Art

A broadcasting receiving apparatus with a so-called timer reservation function is conventionally known. In this apparatus, the broadcasting start time of a given broadcasting program is set in a memory. When the set broadcasting start time is reached, a power source current is automatically supplied to individual circuits of a main body of the broadcasting receiving apparatus, thereby receiving a broadcasting electric wave by a receiving unit.

Such a conventional broadcasting receiving apparatus with a timer reservation function, however, still requires some improvements.

That is, once a listener or viewer sets a timer reservation in this conventional broadcasting receiving apparatus with a timer reservation function, a power source is automatically switched on even if the listener or viewer is absent or he or she does not want to switch on the broadcasting receiving apparatus for some reason despite his or her earlier reservation. The apparatus automatically performs this unnecessary processing which consumes power against the will of the user. Therefore, the user must cancel the timer reservation each time he or she wants to prevent switching on of the broadcasting receiving apparatus when it is unnecessary to switch on the apparatus any more, resulting in poor operability.

SUMMARY OF THE INVENTION

The present invention has been made to solve the above conventional problem.

It is, therefore, an object of the present invention to provide a broadcasting receiving apparatus capable of saving power consumption of the overall apparatus.

It is another object of the present invention to provide a broadcasting receiving apparatus capable of saving power consumption of the overall apparatus and capable of automatically selecting a broadcasting program of interest without causing a user to perform any cumbersome channel select manipulation.

It is still another object of the present invention to provide a broadcasting receiving apparatus capable of saving power consumption of the overall apparatus and capable of immediately and reliably informing a user of completion of a broadcasting program.

In order to achieve the above objects, one arrangement of the present invention comprises receiving means capable of receiving a broadcasting electric wave, setting means capable of setting, as reservation time data, a broadcasting start time of a broadcasting program to be broadcasted by means of the broadcasting electric wave received by the receiving means, current time counting means for counting a current time, power source means for supplying a power source current to individual circuits of a broadcasting receiving apparatus main body including the receiving means, power switching means capable of being operated manually, determining means for determining, when the power switching means is operated manually, whether the current time counted by the current time counting means is equal to or close to the reservation time indicated by the reservation time data set by the setting means, and control means for controlling, when the determining means determines that the current time is equal to or close to the broadcasting start time, the power source means to automatically start supply of a power source current to the individual circuits of the broadcasting receiving apparatus main body and the receiving means to receive a broadcasting electric wave.

Another arrangement of the present invention comprises receiving means capable of receiving broadcasting electric waves, channel selecting means for selecting a broadcasting electric wave of one broadcasting station from the broadcasting electric waves received by the receiving means, setting means capable of setting channel number data indicating a broadcasting station to be selected by the channel selecting means and reservation time data indicating a reservation time at which the broadcasting station indicated by the channel number data is to be selected, current time counting means for counting a current time, power source means for supplying a power source current to individual circuits of a broadcasting receiving apparatus main body including the receiving means, power switching means capable of being operated manually, determining means for determining, when the power switching means is operated manually, whether the current time counted by the current time counting means is equal to or close to the reservation time indicated by the reservation time data set by the setting means, and control means for controlling, when the determining means determines that the current time is equal to or close to the broadcasting start time, the power source means to automatically start supply of a power source current to the individual circuits of the broadcasting receiving apparatus main body and the channel selecting means to automatically select the broadcasting station indicated by the channel number data set by the setting means.

Still another arrangement of the present invention comprises receiving means capable of receiving broadcasting electric waves, channel selecting means for selecting a broadcasting electric wave of one broadcasting station from the broadcasting electric waves received by the receiving means, setting means capable of setting, as reservation data for each broadcasting station, channel number data indicating a broadcasting station to be selected by the channel selecting means and reservation time data indicating a reservation time at which the broadcasting station indicated by the channel number data is to be selected, current time counting means for counting a current time, power source means for supplying a power source current to individual circuits of a broadcasting receiving apparatus main body including the receiving means, power switching means capable of being operated manually, first determining means for determining, when the power switching means is operated manually, whether the current time counted by the current time counting means is equal to or close to the reservation time indicated by the reservation time data of one of a plurality of pieces of reservation data set by the setting means, first control means for controlling, when the first determining means determines that the current time is equal to or close to the broadcasting start time, the power source means to automatically start supply of a power source current to the individual circuits of the broadcasting receiving apparatus main body and the channel selecting means to automatically select a broadcasting station indicated by the channel number data of the corresponding reservation data, second determining means for determining, when the first determining means determines that the current time is not equal to nor close to the broadcasting start time, whether the current time is equal to or close to a reservation time indicated by reservation time data of any one of a plurality of pieces of reservation data other than the preceding reservation data, and second control means for controlling, when the second determining means determines that the current time is equal to or close to the reservation time indicated by reservation time data of another one of a plurality of pieces of reservation data, the power source means to automatically start supply of a power source current to the individual circuits of the broadcasting receiving apparatus main body and the channel selecting means to automatically select a broadcasting station indicated by the channel number data of the corresponding reservation data.

Still another arrangement of the present invention further comprises third control means for controlling, when the second determining means determines that the current time is not equal to nor close to a reservation time indicated by reservation time data of any of a plurality of pieces of reservation data, the channel selecting means to automatically select a broadcasting station set before the power source means starts supplying a power source current.

Still another arrangement of the present invention comprises receiving means capable of receiving a broadcasting electric wave, setting means for setting broadcasting start time data indicating a broadcasting start time of a broadcasting program to be broadcasted by means of the broadcasting electric wave received by the receiving means, power switching means capable of being operated manually, current time counting means for counting a current time, power source means for supplying a power source current to individual circuits of a broadcasting receiving apparatus main body including the receiving means, determining means for determining, when the power switching means is operated manually, whether the current time counted by the current time counting means is equal to or close to the broadcasting start time indicated by the broadcasting start time data set by the setting means, power supply starting means for starting supply of a power source current from the power source means to the individual circuits of the broadcasting receiving apparatus main body when the determining means determines that the current time is equal to or close to the broadcasting start time, broadcasting completion detecting means for detecting, when the power supply starting means starts supply of a power source current, whether broadcasting of all broadcasting contents of a broadcasting program broadcasted by means of the broadcasting electric wave received by the receiving means is completed, and power supply stopping means for stopping supply of a power source current from the power source means to the individual circuits of the broadcasting receiving apparatus main body when the broadcasting completion detecting means detects that broadcasting of all the broadcasting contents of the broadcasting program is completed.

Still another arrangement of the present invention further comprises broadcasting content storing means for sequentially storing the broadcasting contents of the broadcasting program broadcasted by means of the broadcasting electric wave received by the receiving means when the power supply starting means starts supply of a power source current.

Still another arrangement of the present invention further comprises broadcasting content storing means for sequentially storing, when the power supply starting means starts supply of a power source current, all broadcasting contents of the broadcasting program broadcasted by means of the broadcasting electric wave received by the receiving means until broadcasting of all the broadcasting contents is completed.

Still another arrangement of the present invention further comprises informing means for informing completion of broadcasting of all broadcasting contents when the broadcasting completion detecting means detects that broadcasting of all the broadcasting contents of the broadcasting program is completed.

Still another arrangement of the present invention further comprises informing means for informing completion of storage of all broadcasting contents when the broadcasting content storing means completely stores all the broadcasting contents of the broadcasting program broadcasted by means of the broadcasting electric wave received by the receiving means.

Still another arrangement of the present invention comprises receiving means capable of receiving a broadcasting electric wave, setting means for setting broadcasting start time data indicating a broadcasting start time of a broadcasting program to be broadcasted by means of the broadcasting electric wave received by the receiving means, power switching means capable of being operated manually, current time counting means for counting a current time, power source means for supplying a power source current to individual circuits of a broadcasting receiving apparatus main body including the receiving means, determining means for determining, when the power switching means is operated manually, whether the current time counted by the current time counting means is equal to or close to the broadcasting start time indicated by the broadcasting start time data set by the setting means, power supply starting means for starting supply of a power source current from the power source means to the individual circuits of the broadcasting receiving apparatus main body when the determining means determines that the current time is equal to or close to the broadcasting start time, broadcasting content storing means for sequentially storing, when the power supply starting means starts supply of a power source current, all broadcasting contents of the broadcasting program broadcasted by means of the broadcasting electric wave received by the receiving means until broadcasting of all the broadcasting contents is completed, broadcasting completion detecting means for detecting whether the broadcasting content storing means stores all the broadcasting contents of the broadcasting program broadcasted by means of the broadcasting electric wave received by the receiving means, and power supply stopping means for stopping supply of a power source current from the power source means to the individual circuits of the broadcasting receiving apparatus main body when the broadcasting completion detecting means detects that broadcasting of all the broadcasting contents of the broadcasting program is completed.

Still another arrangement of the present invention further comprises informing means for informing completion of broadcasting of all the broadcasting contents when the broadcasting completion detecting means detects that broadcasting of all the broadcasting contents of the broadcasting program is completed.

Still another arrangement of the present invention further comprises informing means for informing completion of storage of all broadcasting contents when the broadcasting content storing means completely stores all the broadcasting contents of the broadcasting program broadcasted by means of the broadcasting electric wave received by the receiving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the circuit configuration of a broadcasting receiving apparatus according to the present invention;

FIG. 2 is a front view showing a keyboard of the broadcasting receiving apparatus shown in FIG. 1;

FIG. 3 is a view showing the stored contents of a memory shown in FIG. 1;

FIG. 9 is a view showing the stored contents of a data header in the memory shown in FIG. 8; and FIG. 10 is a flow chart for explaining the operation of a CPU shown in FIG. 6.

DETAILED DESCRIPTION OF THE PREFERRED EMBODIMENTS

Figure 4:
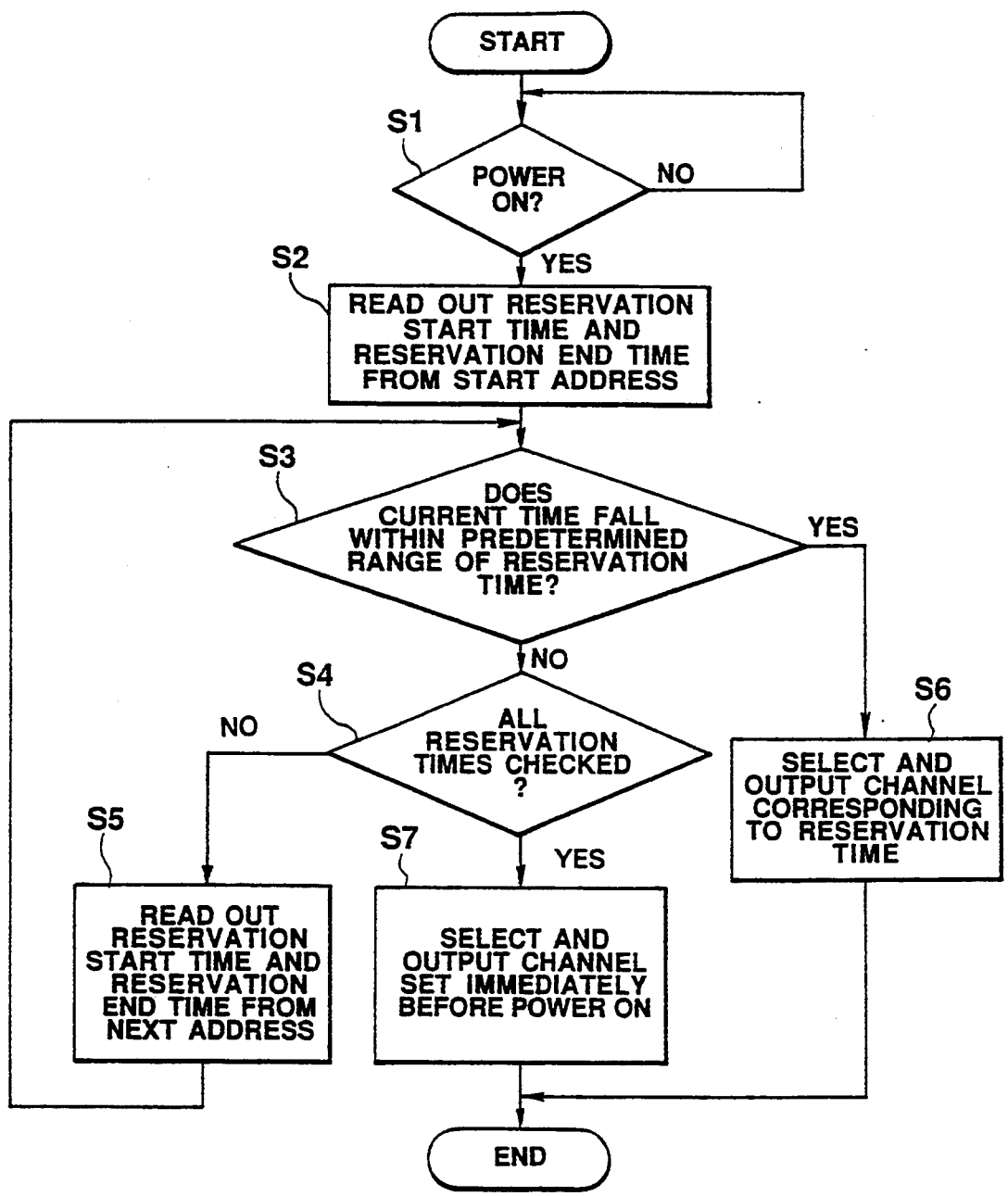
FIG. 4 is a flow chart for explaining a reserved channel selecting operation performed by a CPU shown in FIG. 1.

Embodiments of the present invention will be described in detail below with reference to the accompanying drawings.

FIGS. 1 to 5 are views showing one embodiment of a broadcasting receiving apparatus according to the present invention.

FIG. 1 is a block diagram showing a broadcasting receiving apparatus 1 according to the embodiment of the present invention. The broadcasting receiving apparatus 1 comprises a receiving unit 2, an output unit 3, a CPU (Central Processing Unit) 4, a memory 5, a clock generator 6, a frequency divider 7, a keyboard 8, and a power source 9.

The power source 9 converts power supplied from an external power source or a battery (not shown) into a predetermined DC voltage and supplies the voltage to the individual circuits of the broadcasting receiving apparatus 1. The power source 9 receives a control signal from the CPU 4 and starts or stops supply of the power to the individual circuits, particularly the receiving unit 2 and the output unit 3, in accordance with the input control signal.

The receiving unit 2 constituting a broadcasting receiving means comprises an antenna, a tuner, a detector, and the like. The antenna receives a broadcasting electric wave, and the tuner tunes to an electric wave having a predetermined frequency from the broadcasting electric waves received by the antenna, thereby extracting a signal having a frequency of a predetermined channel. The detector performs demodulation and detection for the signal with a frequency of a predetermined channel extracted by the tuner, thereby extracting a broadcasting signal. The extracted broadcasting signal is sent to the output unit 3.

When the broadcasting receiving apparatus 1 is a television set, the output unit 3 is constituted by a cathode-ray tube (CRT) or a liquid crystal display (LCD), a control circuit for the CRT or LCD, and a voice output device such as a loudspeaker. When the broadcasting receiving apparatus 1 is a radio, the output unit 3 is constituted by a voice output device such as a loudspeaker and a control circuit for the device.

The CPU 4 comprises, e.g., a microprocessor, a ROM (Read-Only Memory), and a RAM (Random Access Memory). The ROM stores programs of the broadcasting receiving apparatus 1, selectable channel numbers, and frequencies corresponding to the channel numbers. The RAM is used as a work memory. The microprocessor controls the individual circuits of the broadcasting receiving apparatus 1 in accordance with the programs stored in the ROM and causes them to function as the broadcasting receiving apparatus 1. The ROM incorporated in the CPU 4 stores frequencies of broadcasting electric waves corresponding to individual channels. When a certain channel number is designated from the keyboard 8 (to be described later), the CPU 4 instructs the corresponding frequency to the receiving unit 2 and in this manner causes the receiving unit 2 to receive a broadcasting signal of the corresponding channel number.

As shown in FIG. 2, the keyboard 8 constituting an external operating means comprises a ten-key pad 11 for selecting a channel number or entering a reservation time, volume keys 12 and 13 for controlling a volume, a power key 14 for switching on/off the power source, a set key 15 for designating setting of a reservation mode and setting of reservation data into the memory 5, a mode switch key 16 for performing switching between a time mode and a channel mode, and a scroll key 17 for selectively scrolling a channel number or a time. Mode switching between a time and a channel number is performed by the mode switch key 16. When the channel mode is set, a given channel number can be selected by manipulating the ten-key pad 11. When the time mode is set, a reservation time can be entered by manipulating the ten-key pad 11. The entered time and channel number are displayed on a CRT or an LCD in the output unit 3 under the control of the CPU 4. If the input reservation time and reservation channel number are appropriate, they can be registered in the memory 5 (to be described later) by depressing the set key 15. The power source of the broadcasting receiving apparatus 1 can be switched on/off by manipulating the power key 14.

The memory 5 is constituted by a RAM and the like and stores data of a program to be reserved. That is, as shown in FIG. 3, the memory 5 stores a plurality of pieces of data of programs to be reserved each of which is a set of a channel number and a start time and an end time of a broadcasting program designated by the channel number.

In order to register data of a program to be reserved into the memory 5, the set key 15 is depressed to set the reservation mode, and the ten-key pad 11 is manipulated to enter a reservation time (a reservation start time and a reservation end time). Thereafter, the set key 15 is depressed again to instruct registration of the reservation time into the memory 5. When the registration of the reservation time is completed, the mode switch key 16 is depressed to switch the mode to the channel mode, and a channel number to be reserved is entered by the ten-key pad 11. When the input of the channel number to be reserved is completed, the set key 15 is depressed to instruct registration of the channel number to be reserved into the memory 5. Registration of data of a program to be reserved can be performed by this registering operation. In order to successively perform registration of data of a program to be reserved, the scroll key 17 is depressed. As a result, a registration condition for the next data of a program to be reserved is set, and the next data can be registered by executing the operation as described above. When registration of the data of a program to be reserved is completed, the set key 15 is depressed to return to a normal channel select mode.

The clock generator 6 is a so-called quartz oscillator constituted by, e.g., a quartz crystal, resistors, and capacitors. The clock generator 6 generates a clock signal having a predetermined frequency.

The frequency divider 7 is constituted by, e.g., assembling several stages of binary counters. The frequency divider 7 divides a frequency of the input clock signal from the clock generator 6 to generate a 1-Hz clock signal usable as a reference signal for a timepiece and supplies the generated clock signal to the CPU 4. The CPU 4 counts a current time in accordance with the input clock signal from the frequency divider 7 and supplies the current time data to the output unit 3. The CPU 4 also uses the current time in program reservation processing (to be described later). Therefore, the CPU 4, the clock generator 6, and the frequency divider 7 function as a timepiece means for counting a current time.

The operation of this embodiment will be described below.

The broadcasting receiving apparatus 1 constantly counts a current time and uses the current time in the program reservation processing (to be described later). The current time can also be sent to the output unit 3 and displayed or provided as a voice output.

That is, while the power source is kept OFF by the ON/OFF key 14 of the keyboard 8, the CPU 4 of the broadcasting receiving apparatus 1 counts a current time in accordance with the input clock signal from the frequency divider 7 and supplies data of the current time to the output unit 3 at each predetermined timing. The output unit 3 informs a user of the input current time data in the form of a predetermined output, e.g., a voice output or a display output.

In this power-OFF condition, if the power ON/OFF key 14 of the keyboard 8 is turned on, the CPU 4 performs program reservation processing as shown in FIG. 4.

That is, in the power-OFF condition, the CPU 4 serves as a determining means and determines whether the power ON/OFF key 14 is depressed to switch on the power source (step S1). If the power source is switched on, the CPU 4 supplies a control signal C (e.g., a signal of "H") instructing an ON operation to the power source 9. Upon receiving the control signal C instructing an ON operation, the power source 9 supplies power to the receiving unit 2, the output unit 3, and the like.

Figure 5:
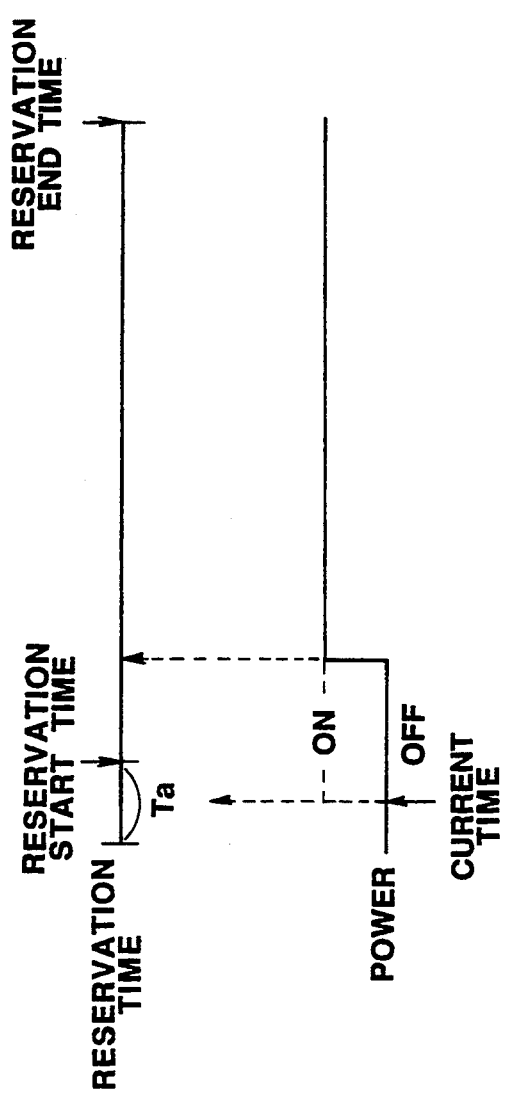
FIG. 5 is a timing chart for explaining the condition of reserved channel selection.

Subsequently, the CPU 4 checks whether data of a program to be reserved is registered in the memory 5. If data of a program to be reserved is registered, the CPU 4 reads out reservation time data, i.e., reservation start time data and reservation end time data registered in the start address of a data area of programs to be reserved (step S2). The CPU 4, acting as said determining means compares the readout reservation time data from the memory 5 with current time data, and determines whether a current time indicated by the current time data falls within a predetermined channel select allowable range of a reservation time indicated by the reservation time data (step S3). That is, as shown in FIG. 5, the CPU 4 determines whether the current time falls within the range of a predetermined time interval (reservation allowable range: Ta) before a reservation start time, e.g., within several minutes before the reservation start time and within the range of the reservation start time to the reservation end time. If the current time falls outside this predetermined channel select allowable range, the CPU 4 checks whether all of reserved program data registered in the memory 5 are completely checked (step S4). If checking of all the reserved program data registered in the memory 5 is not completed, the CPU 4 reads out reservation time data registered in the next address of the reserved program data area of the memory 5 (step S5). The flow returns to step S3, and the CPU 4 similarly checks whether the current time falls within a predetermined channel select allowable range of the readout reservation time data (step S3). Note that the reservation allowable range Ta may be either registered in the ROM of the CPU 4 beforehand or registered in the memory 5 by a user.

If the current time is determined to falls within the predetermined channel select allowable range of the reservation time in step S3, the CPU 4 serves as a control means for controlling the system to allow the receiving unit 2 to receive a broadcasting electric wave having a frequency indicated by the reserved channel number registered in the memory 5 in correspondence with the reservation time data, and causes the output unit 3 to output a broadcasting signal of the reserved channel number received by the receiving unit 2 in the form of a display output and a voice output, or a voice output alone (step S6).

If no reserved program data to be selected is found although the current time falls outside the predetermined channel select allowable range of the reservation time in step S3 and all the reserved program data registered in the memory 5 are completely checked in step S4, the CPU 4 instructs the receiving unit 2 to select a channel, which is set immediately before the power source is switched on, as a channel to be selected. The CPU 4 thus causes the receiving unit 2 to receive a broadcasting signal of that channel and the output unit 3 to output the received signal (step S7).

If, therefore, data of a program to be reserved is registered beforehand in the memory 5 and the power ON/OFF key 14 is turned on during a time interval falling within the predetermined channel select allowable range of a reservation time indicated by that reserved program data, it is possible to select a broadcasting station of a channel indicated by a reserved channel number registered in correspondence with the reservation time data and to output the broadcasting signal of that channel. Therefore, a listener or viewer need only store in advance channel number data and reservation time data corresponding to a desired program in the memory 5 and turn on the power ON/OFF key 14 near the reservation time. This makes it possible to automatically select a broadcasting station of a channel indicated by the preset reserved channel number. As a result, it is possible to omit a conventional cumbersome manipulation of switching on the power source and then selecting a channel of a desired program. It is also possible to omit an operation of canceling a timer reservation function when a program ends and to eliminate unnecessary processing of keeping a power source ON by the timer reservation function when, for example, a user is absent. This improves the operability of the broadcasting receiving apparatus.

According to this embodiment, when data of a program to be reserved is registered and the power source is switched on at a time within the predetermined channel select allowable range of a reservation time, it is possible to select a channel registered in correspondence with the reservation time and output a broadcasting signal of that channel. Therefore, a listener or viewer need only store a channel and a reservation time of a desired program in the memory and switch on the power near the reservation time. This makes it possible to automatically select the preset channel. As a result, it is possible to omit a conventional cumbersome manipulation of switching on the power source and then selecting a channel. It is also possible to omit an operation of canceling a timer reservation function and to eliminate unnecessary processing of keeping the power ON when, for example, a user is absent. This improves the operability of the broadcasting receiving apparatus.

Another embodiment of the present invention will be described below.

Figure 6:
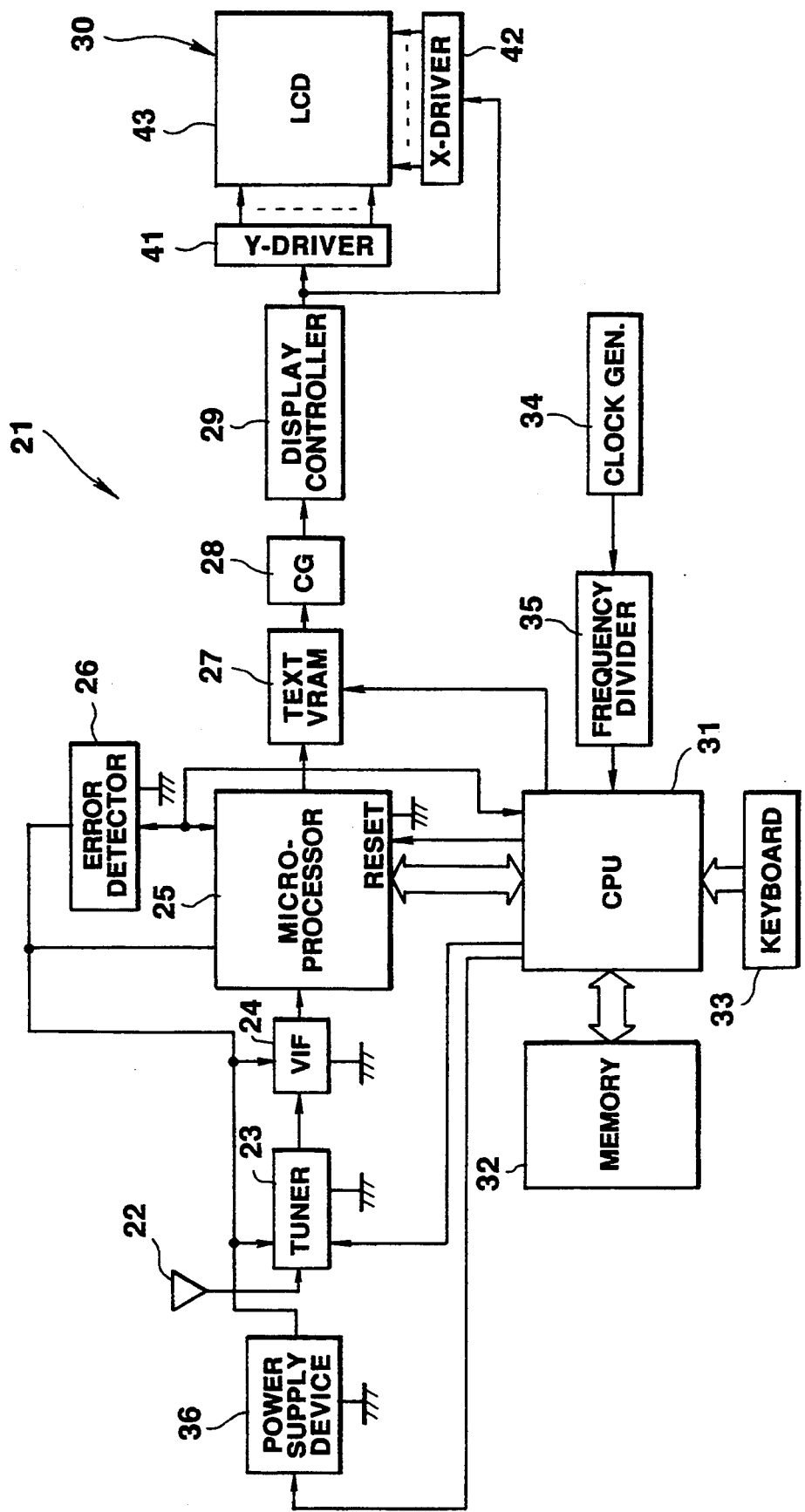
FIG. 6 is a block diagram showing a broadcasting receiving apparatus according to another embodiment of the present invention.

FIGS. 6 to 10 are views showing another embodiment of a broadcasting receiving apparatus according to the present invention. FIG. 6 is a block diagram showing a broadcasting receiving apparatus 21 of this embodiment. The broadcasting receiving apparatus 21 comprises an antenna 22, a tuner 23, a VIF (Video Intermediate Frequency) unit 24, a microprocessor 25, an error detector 26, a text VRAM (Video-RAM) 27, a CG (character generator) 28, a display controller 29, a display 30, a CPU 31, a memory 32, a keyboard 33, a clock generator 34, a frequency divider 35, and a power source 36. This broadcasting receiving apparatus 21 can receive at least teletext broadcasting or repetitive broadcasting of programs of a particular item.

The power source 36 converts power supplied from an external power source or a battery (not shown) into a predetermined DC voltage and supplies the voltage to the individual sections of the broadcasting receiving apparatus 21. The power source 36 receives a control signal from the CPU 31 and starts or stops supply of the power in accordance with the input control signal.

In the broadcasting receiving apparatus 21, the antenna 22 receives a broadcasting electric wave, and the broadcasting electric wave received by the antenna 22 is supplied to the tuner 23. The tuner 23 is a so-called electronic tuner constituted by coils, capacitors, resistors, and the like, and operates under the control of the CPU 31. The tuner 23 tunes to an electric wave having a frequency instructed by the CPU 31, extracts a signal having the frequency, and supplies the signal to the VIF unit 24.

The VIF unit 24 is constituted by, e.g., a demodulator and a detector. The VIF unit 24 performs demodulation and detection for the input signal from the tuner 23 and extracts a video signal component from the signal.

The microprocessor 25 comprises an A/D converter, a buffer, a decoder, and the like. The microprocessor 25 causes the A/D converter to convert the input analog video signal from the VIF unit 24 into a digital signal and stores the digital signal in the buffer. The microprocessor 25 also causes the decoder to decode the input signal into character data.

The digital signals stored in the buffer of the microprocessor 25 are sequentially extracted and sent to the error detector 26. The error detector 26 detects the number of errors in the signals and supplies information indicating the detected number of errors to the microprocessor 25 and the CPU 31.

The text VRAM 27 stores data representing the positions and sizes of characters on the display screen and character code data under the control of the CPU 31.

The CG 28 stores data representing display dot patterns corresponding to the respective sizes and codes. Upon receiving the data of the sizes and the codes from the text VRAM 27, the CG 28 supplies a signal of the corresponding dot patterns to the display controller 29.

The display controller 29 is constituted by an entry sequence counter and a display position control circuit. The display controller 29 generates a position signal and a display signal such that the input dot pattern arrays from the CG 28 are sequentially displayed from the upper left position to the lower right position of the display screen, and supplies the signals to the display 30.

The display 30 comprises a Y-driver 41, an X-driver 42, and an LCD (Liquid Crystal Display) 43. The LCD 43 is driven by drive signals from the Y-driver 41 and the X-driver 42. On the basis of the input position and display signals from the display controller 29, the Y-driver 41 and the X-driver 42 output, to the LCD 43, drive signals for controlling ON/OFF operations for individual coordinate points of the LCD 43. In the LCD 43, display pixels are arranged in a dot matrix manner and turned on (e.g., displayed in black) or turned off (not displayed) in accordance with the drive signals from the Y-driver 41 and the X-driver 42.

The CPU 31 comprises, e.g., a microprocessor, a ROM, and a RAM. The ROM stores programs of the broadcasting receiving apparatus 21, data of selectable channel numbers, and frequencies corresponding to the channel number data. The RAM is used as a work memory. The microprocessor controls the individual sections of the broadcasting receiving apparatus 21 in accordance with the programs stored in the ROM to cause them to function as the broadcasting receiving apparatus 21. The CPU 31 drives the power source 36 on the basis of reservation data registered in the memory 32 (to be described later), thereby controlling start/stop of power supply. The CPU 31 also causes the memory 32 to store all broadcasting information of a reserved program. When storage of broadcasting information of all pages of the program into the memory 32 is completed, the CPU 31 controls the power source 36 to stop power supply. The CPU 31, therefore, serves as a control means for controlling start/stop of power supply on the basis of reservation data and controlling storage of broadcasting information.

Figure 7:
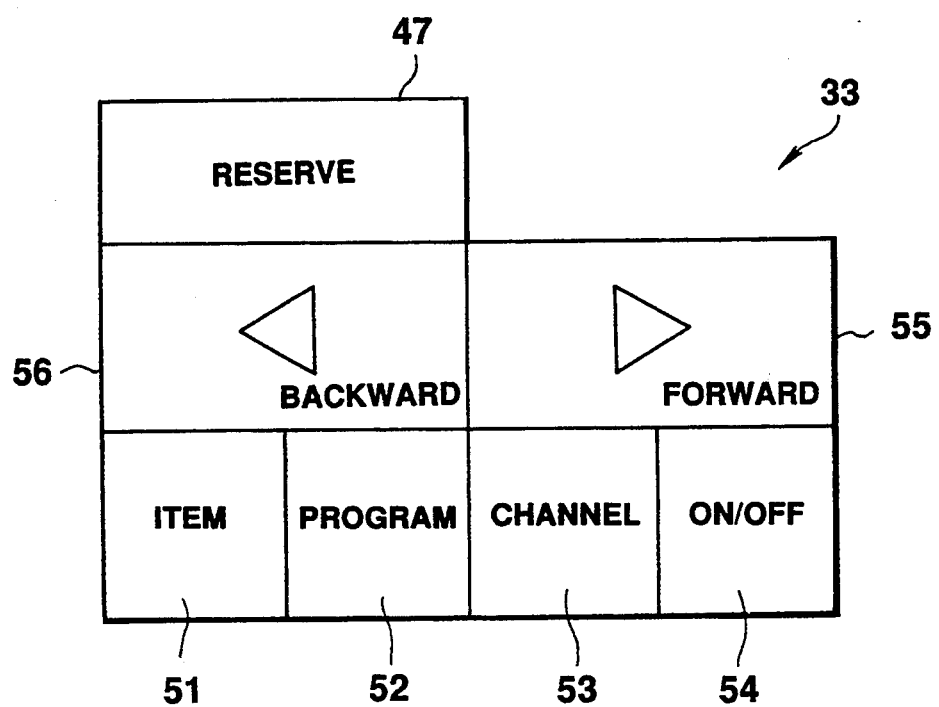
FIG. 7 is a front view showing a keyboard of the broadcasting receiving apparatus shown in FIG. 6.

As shown in FIG. 7, the keyboard 33 includes an item select key 51, a program select key 52, a channel select key 53, a power ON/OFF key 54, a forward scroll key 55, a backward scroll key 56, and a reservation key 47. The keyboard 33 is used to perform various operations of the broadcasting receiving apparatus 21. The item key 51 is used to select an item (e.g., items indicating the types of programs such as weather forecast, traffic information, stock price information, news, and cooking) of a program to be selected, and the channel key 53 is used to select the channel of a broadcasting station. The program select key 52 is used to select a program of each channel, and the ON/OFF key 54 is used to switch on/off the power source of the broadcasting receiving apparatus 21. When the item key 51 is turned on, the scroll key 55 or 56 makes it possible to scroll forward or backward, respectively, a plurality of items stored beforehand in the ROM of the CPU 31 or a plurality of items registered in the memory 32 (to be described later). When the program key 52 is turned on, the keys 55 and 56 are used to scroll selectable programs. In addition, when the channel key 53 is turned on, selectable channels can be scrolled using the keys 55 and 56. The reservation key 47 is used to reserve a program whose broadcasting information is to be stored in the memory 32. A program selected using the item key 51, the channel key 53, the program key 52, and the scroll keys 55 and 56 can be registered in the memory 32 by the reservation key 47. That is, after a user selects a program to be reserved by using the above keys, he or she turns on the reservation key 47. As a result, data of the selected program is registered as reservation data in the memory 32.

Figure 8:
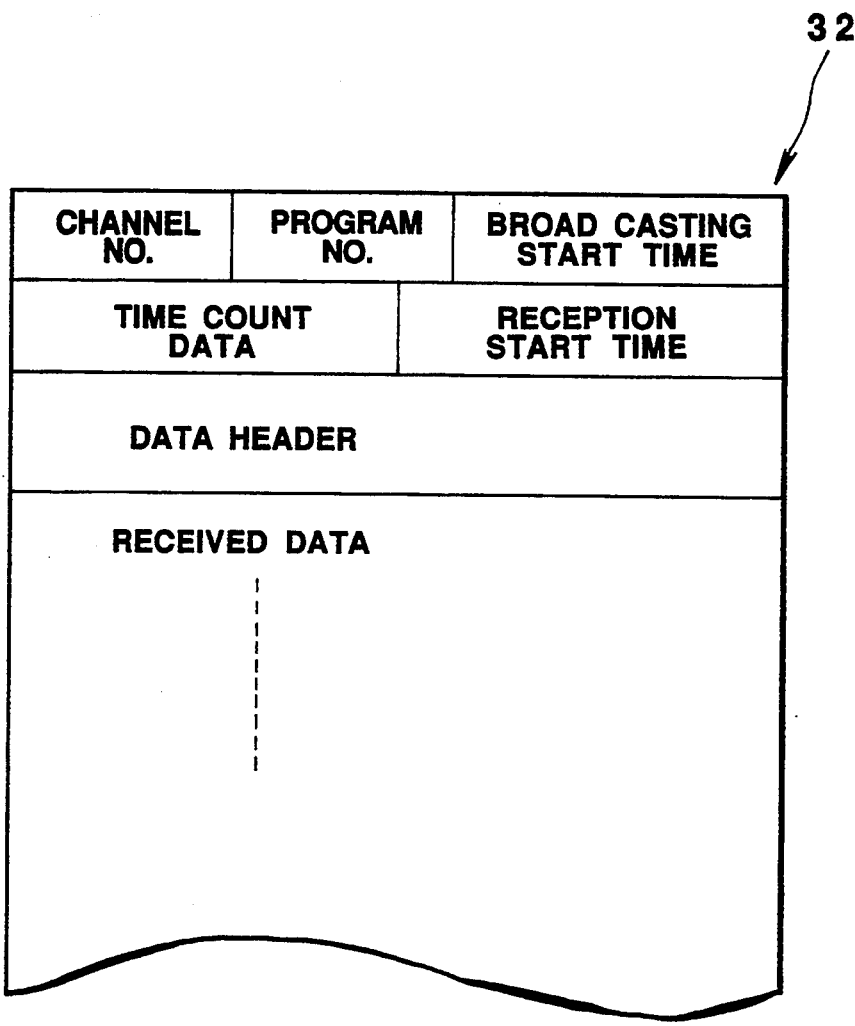
FIG. 8 is a view showing the stored contents of a memory shown in FIG. 6.

The memory 32 comprises a RAM and the like and stores reservation data described above or broadcasting information of programs designated by the reservation data. As shown in FIG. 8, the memory 32 is divided into storage areas for a channel number, a program number, a broadcasting start time, current time data, a reception start time, a data header, and received data. Channel number data, program number data, and broadcasting time data indicating the broadcasting time of the program are written in the channel number area, the program number area, and the broadcasting start time area, respectively, by operating the keyboard 33. That is, when a user turns on the channel key 53, corresponding channel number data is read out from the ROM and displayed on the LCD 43. If the displayed channel number is not a desired channel number, the user manipulates the scroll keys 55 and 56 to scroll channel numbers to be displayed. When a desired channel number is displayed on the LCD 43, the user selects the displayed channel number. When the channel number is selected, the CPU 31 stores data indicating the selected channel number into the predetermined channel storage area of the memory 32. The user then selects a program number in the same manner as described above. That is, he or she turns on the program key 52 and uses the scroll keys 55 and 56 to display a desired program number on the LCD 43. When the desired program number is displayed, the user selects the displayed program number. Data indicating the selected program number is stored in the program number storage area of the memory 32. After selecting the program number, the user enters a broadcasting time of the program from the keyboard 33. The input broadcasting time is written in the broadcasting start time storage area. In response to the input broadcasting start time, the CPU 31 subtracts a time sufficient to start reception of the program corresponding to the broadcasting start time from the broadcasting start time, and writes the resulting difference as a reception start time in the reception start time storage area. Note that a current time calculated by the CPU 31 on the basis of input clocks from the frequency divider 35 is written in the current time data area.

As shown in FIG. 9, the data header storage area of the memory 32 stores, for example, various pieces of information related to data of a given program, such as the total number of pages and a program data length. The received data storage area sequentially stores broadcasting contents (broadcasting information) of a program page by page.

The memory 32, therefore, serves as a reservation data storing means capable of storing, as reservation data, a reserved channel number, a reserved program name in the reserved channel number, and a reservation time of the reserved program, and also functions as a broadcasting information storing means for storing broadcasting contents of a reserved program.

The clock generator 34 is a so-called quartz oscillator constituted by a quartz crystal, resistors, capacitors, and the like. The clock generator 34 generates a clock signal having a predetermined frequency.

The frequency divider 35 is constituted by, e.g., combining several stages of binary counters. The frequency divider frequency-divides the input clock signal from the clock generator 34 to generate a 1-Hz clock signal usable as a reference signal for a timepiece and supplies the signal to the CPU 31. The CPU 31 counts a current time in accordance with the input clock signal from the frequency divider 35 and causes the LCD 43 to display the current time. The CPU 31 also uses this clock signal in various control operations, such as ON/OFF control of the power source 36 of the broadcasting receiving apparatus 21.

The operation of this embodiment will be described below.

Since the broadcasting receiving apparatus 21 can display a current time, the apparatus displays a current time on the LCD 43 when it does not receive broadcasting.

That is, while the ON/OFF key 54 of the keyboard 33 is kept OFF, the CPU 31 of the broadcasting receiving apparatus 21 counts a current time in accordance with the input clock signal from the frequency divider 35, determines a display position, and supplies information of the current time to a corresponding position of the text VRAM 27. The text VRAM 27 transfers the current time information to the display controller 29 via the CG 28, thereby displaying the current time at a predetermined position of the LCD 43.

When the ON/OFF key 54 of the keyboard 33 is turned on in this condition, the CPU 31 supplies a control signal (e.g., a signal of "H") C instructing an ON operation to the power source 36. Upon receiving the control signal C instructing an ON operation, the power source 36 supplies power to the tuner 23, the VIF unit 24, the microprocessor 25, and the error detector 26. The CPU 31 also supplies a reset signal to the microprocessor 25 to cause the microprocessor 25 to perform initialization. When the initialization is completed, the tuner 23 extracts a signal having a frequency corresponding to a predetermined channel from broadcasting electric waves received by the antenna 22, and the VIF unit 24 performs demodulation and detection for the extracted signal. Thereafter, a video signal corresponding to a program designated by the CPU 31 is selected and output to the microprocessor 25. The microprocessor 25 converts the video signal into a digital signal using the A/D converter and stores the signal in the buffer in units of scan lines. The stored signal is then transferred to the error detector 26 and subjected to error signal detection performed by the detector 26. The error detector 26 outputs the detected number of errors to the microprocessor 25 and the CPU 31. If the number of errors falls within an error recoverable range, the microprocessor 25 decodes the signal by using the internal decoder and supplies the decoded signal to the text VRAM 27. The text VRAM 27 sequentially supplies data of character codes and sizes in an order from the upper left position to the lower right position of the display screen to the CG 28. The CG 28 supplies pattern data corresponding to the input data from the text VRAM 27 to the display controller 29. The display controller 29 determines display positions and display contents and controls the Y-driver 41 and the X-driver 42. The Y-driver 41 and the X-driver 42 output drive signals to display the corresponding contents at the corresponding positions of the LCD 43.

In this manner, when the ON/OFF key 54 is turned on, the broadcasting receiving apparatus 21 displays the contents of a preset channel on the LCD 43. However, if the displayed contents are not the contents (program) of interest, a user can change the program by operating the keyboard 33.

A normal program change operation is performed by manipulating the program key 52 or the channel key 53 of the keyboard 33. That is, in order to change the program number, a user can sequentially change program numbers by turning on the program key 52 and manipulating the scroll keys 55 and 56. In order to change the channel number, a user can sequentially change channel numbers by turning on the channel key 53 and manipulating the scroll keys 55 and 56. In this case, the CPU 31 supplies channel number data indicating the selected channel number to the tuner 23 to cause the tuner 23 to extract an electric wave of a broadcasting station corresponding to the channel number. The CPU 31 also supplies program number data indicating the program number to the microprocessor 25 to cause the microprocessor 25 to select a video signal corresponding to the program number and to perform decoding and display processing for the video signal. The selection performed by a user is completed when a program number in a desired channel number is displayed.

Broadcasting such as teletext broadcasting, however, in which a broadcasting program concerning a specific item, e.g., weather forecast or traffic information is repeatedly broadcasted on a plurality of channels at the same time, the contents of one broadcasting program are constituted by a plurality of pages.

In this embodiment, therefore, in order to efficiently receive such a teletext broadcasting program with a low consumption power, the broadcasting contents of a reserved program are stored in the memory 32. In addition, when storage of all the broadcasting contents of the program is completed, power supply to the individual circuits is stopped.

That is, as shown in FIG. 10, the CPU 31 checks in a power-OFF condition whether a reservation mode is set for each predetermined time set in advance (step H1). If the reservation mode is set, the CPU 31 reads out reservation data stored in the memory 32 (step H2) and checks whether a current time has reached a stored reception start time (step H3). If the current time has not reached the stored reception start time yet, the flow returns to step H1, and the CPU 31 again checks the reservation mode and the current time.

If the current time has reached the stored reception start time in step H3, the CPU 31 instructs the power source 36 to supply power to the individual circuits. In response to this instruction, the power source 36 starts supplying power to the circuits, such as the tuner 23, the VIF 24 unit, and the microprocessor 25 (step H4). When power supply is started, the CPU 31 controls the tuner 23 and the microprocessor 25 on the basis of the reservation data read out from the memory 32, thereby sequentially performing reception of a reserved program and extraction of character data from the program signal. The sequentially received contents of the teletext broadcasting are stored page by page in the received data storage area of the memory 32 (step H5). When storage of the contents of one page of the teletext broadcasting is completed, the CPU 31 checks whether reception of broadcasting contents of all pages of the broadcasting program is completed and storage of the received contents into the memory 32 is completed (step H6). If reception of the broadcasting contents of all pages of the program and storage of the received contents into the memory 32 are not completed, the flow returns to step H5, and reception of the broadcasting contents of the next page and storage of the received contents into the memory 32 are performed.

When reception of the broadcasting contents of all pages and storage of the received contents into the memory 32 are completed, the CPU 31 reads out reception completion message data stored beforehand in the ROM or the like and displays the readout reception completion message data, such as "recording of a reserved program is completed", on the LCD 43, thereby informing completion of recording (step H7). Note that this completion information is not limited to a message displayed on the LCD 43 but may be a buzzer or a completion message output in the form of a voice. Alternatively, these information forms may be provided in a combination of two or more of them.

In response to this completion information, the CPU 31 instructs the power source 36 to stop power supply to the individual circuits. In accordance with this instruction for power supply stop, the power source 36 stops supplying the power to the circuits, such as the tuner 23, the VIF 24 unit, and the microprocessor 25 (step H8).

As described above, when a user reserves a desired program in advance, broadcasting contents of all pages of the reserved program are stored in the memory 32. In addition, when storage of the broadcasting contents of the broadcasting program is completed, completion information is output upon completion of storage, and supply of a power source current from the power source to the individual circuits is stopped, thereby switching off the power source 36 of the broadcasting receiving apparatus 21. Therefore, the broadcasting contents that the user intends to watch later can be reliably stored in the memory 32. In addition, since completion information is output when storage of the broadcasting contents into the memory 32 is completed, the user can immediately acquire necessary broadcasting contents from the stored broadcasting contents of all pages upon receiving the completion information. Furthermore, when storage of the broadcasting contents into the memory 32 is completed, the power source of the broadcasting receiving apparatus 21 is switched off upon completion of storage. As a result, unnecessary supply of a power source current to the individual circuits is prevented to reduce power consumption. This makes it feasible to apply the present invention to a portable broadcasting receiving apparatus.

According to the above embodiment, when a listener or viewer registers a program to be reserved and the start time of the program in the memory 32, power supply is automatically started, and broadcasting contents of all pages of the reserved program are received and stored in the memory 32. When storage of the broadcasting contents of all the pages is completed, the power supply is stopped. As a result, it is possible to immediately and reliably store necessary information in the memory 32 and to use the stored information. It is also possible to save consumption power, and this makes it possible to apply the broadcasting receiving apparatus of the present invention to a portable broadcasting receiving apparatus in which a low power consumption is an absolute condition.

In addition, according to this embodiment, when storage of all broadcasting contents of a reserved program of interest into the memory 32 is completed, a user is informed of this completion. Therefore, he or she can confirm the completion of storage of necessary broadcasting contents into the memory 32 and can therefore immediately acquire necessary information.

Additional advantages and modifications will readily occur to those skilled in the art. Therefore, the invention in its broader aspects is not limited to the specific details, and representative devices, illustrated examples shown and described herein. Accordingly, various modifications may be made without departing from the spirit or scope of the general inventive concept as defined by the appended claims and their equivalents.

What is claimed is:

1. A broadcasting receiving apparatus comprising:
   receiving means for receiving a broadcasting electric wave;
   setting means for setting, as reservation time data, a broadcasting start time of a broadcasting program to be broadcasted by means of the broadcasting electric wave received by said receiving means;
   current time counting means for counting a current time;
   power source means for supplying a power source current to individual circuits of a broadcasting receiving apparatus main body including said receiving means;
   manually operable power switching means for selectively instructing an on and an off condition of said power source means; and
   control means including:
      means for determining, when said manually operable power switching means is operated manually to instruct an on condition of said power source means, whether a current time counted by said current time counting means is equal to or close to a reservation time indicated by the reservation time data set by said setting means; and
      means for controlling said power source means such that when said determining means determines that said current time is equal to or close to said reservation time, a power source current is automatically supplied to the individual circuits of said broadcasting receiving apparatus main body and to said receiving means to enable a broadcasting electric wave to be received, and for further controlling said power source means so as not to start supply of the power source current to the individual circuits of said broadcasting receiving apparatus main body when said determining means determines that said current time is neither equal to nor sufficiently close to said reservation time.

2. A broadcasting receiving apparatus comprising:
   receiving means for receiving broadcasting electric waves from a plurality of broadcasting stations;
   channel selecting means for selecting a broadcasting electric wave of one broadcasting station from the broadcasting electric waves received by said receiving means;
   setting means for setting channel number data indicating a broadcasting station to be selected by said channel selecting means, for setting and reservation time data indicating a reservation time at which the broadcasting station indicated by the channel number data is to be selected;
   current time counting means for counting a current time;
   power source means for supplying a power source current to individual circuits of a broadcasting receiving apparatus main body including said receiving means;
   manually operable power switching means for selectively instructing an on and an off condition of said power source means; and
   control means including:
      means for determining, when said manually operable power switching means is operated manually to instruct an on condition of said power source means, whether a current time counted by said current time counting means is equal to or close to a reservation time indicated by the reservation time data set by said setting means; and
      means for controlling said power source means such that when said determining means determines that said current time is equal to or close to said reservation time, a power source current is automatically supplied to the individual circuits of said broadcasting receiving apparatus main body and to said channel selecting means to automatically select the broadcasting station indicated by the channel number data set by said setting means, and for further controlling said power source means so as not to start supply of the power source current to the individual circuits of said broadcasting receiving apparatus main body when said determining means determines that said current time is neither equal to nor sufficiently close to said reservation time.

3. A broadcasting receiving apparatus comprising:
   receiving means for receiving broadcasting electric waves from a plurality of broadcasting stations;

channel selecting means for selecting a broadcasting electric wave of one broadcasting station from the broadcasting electric waves received by said receiving means;

setting means for setting, as reservation data for each broadcasting station, channel number data indicating a broadcasting station to be selected by said channel selecting means and reservation time data indicating a reservation time at which the broadcasting station indicated by the channel number data is to be selected;

current time counting means for counting a current time;

power source means for supplying a power source current to individual circuits of a broadcasting receiving apparatus main body including said receiving means;

manually operable power switching means for selectively instructing an on and an off condition of said power source means; and control means including:

means for first determining, when said manually operable power switching means is operated manually to instruct an on condition of said power source means, whether a current time counted by said current time counting means is equal to or close to a given reservation time indicated by the reservation time data of one of a plurality of pieces of reservation data set by said setting means;

means for controlling, when it is determined that said current time is equal to or close to said given reservation time, said power source means to automatically start supply of a power source current to the individual circuits of said broadcasting receiving apparatus main body;

said channel selecting means automatically selecting a broadcasting station indicated by the channel number data of the corresponding reservation data; and said control means further including:

means for determining, when it is first determined that said current time is not equal to nor close to said given reservation time, whether said current time is equal to or close to another reservation time indicated by another reservation time data of any one of a plurality of pieces of reservation data set by said setting means; and means for controlling, when it is determined that said current time is equal to or close to said another reservation time indicated by reservation time data of another one of said plurality of reservation data, said power source means to automatically start supply of a power source current to the individual circuits of said broadcasting receiving apparatus main body and to said channel selecting means to automatically select a broadcasting station indicated by the channel number data of the corresponding another reservation time data.

4. An apparatus according to claim 3, wherein said control means further comprises means for controlling, when it is determined that said current time is not equal to nor close to a reservation time indicated by reservation time data of any of a plurality of reservation data set by said setting means, said channel selecting means to automatically select a broadcasting station set before said power source means starts supplying a power source current.

* * * * *